(12) United States Patent
Chandran et al.

(10) Patent No.: US 11,479,727 B2
(45) Date of Patent: Oct. 25, 2022

(54) SYSTEM AND METHOD FOR FLEXIBLE CONVERSION OF FEEDSTOCK TO OIL AND GAS

(71) Applicant: ThermoChem Recovery International, Inc., Baltimore, MD (US)

(72) Inventors: Ravi Chandran, Ellicott City, MD (US); Daniel Michael Leo, Baltimore, MD (US); Shawn Robert Freitas, Corvallis, OR (US)

(73) Assignee: ThermoChem Recovery International, Inc., Baltimore, MD (US)

( * ) Notice: Subject to any disclaimer, the term of this patent is extended or adjusted under 35 U.S.C. 154(b) by 0 days.

(21) Appl. No.: 14/355,948

(22) PCT Filed: Nov. 5, 2012

(86) PCT No.: PCT/US2012/063605
§ 371 (c)(1),
(2) Date: May 2, 2014

(87) PCT Pub. No.: WO2013/067532
PCT Pub. Date: May 10, 2013

(65) Prior Publication Data
US 2014/0296586 A1  Oct. 2, 2014

Related U.S. Application Data (60) Provisional application No. 61/556,048, filed on Nov. 4, 2011.

(51) Int. Cl.
*C10G 1/04*  (2006.01)
*B01J 6/00*  (2006.01)
(Continued)

(52) U.S. Cl.
CPC .............. *C10G 1/045* (2013.01); *B01J 6/008* (2013.01); *C10B 49/22* (2013.01); *C10B 53/00* (2013.01);
(Continued)

(58) Field of Classification Search
CPC ... C10L 1/00; C10L 2200/0469; C10G 1/045; B01J 6/008
See application file for complete search history.

(56) References Cited

U.S. PATENT DOCUMENTS 4,069,024 A  1/1978  Fernandes
4,219,402 A  8/1980  Degeorge
(Continued)

FOREIGN PATENT DOCUMENTS

CN  1912070 A  2/2007
CN  101709228 A  5/2010
(Continued)

OTHER PUBLICATIONS

Extended Search report dated Jul. 8, 2015 issued in European counterpart application (No. 12845762.9).
(Continued)

*Primary Examiner* — Ellen M Mcavoy
*Assistant Examiner* — Ming Cheung Po
(74) *Attorney, Agent, or Firm* — Fish & Richardson P.C.

(57) ABSTRACT

A feedstock flexible process for converting feedstock into oil and gas includes (i) indirectly heated hydrous devolatilization of volatile feedstock components, (ii) indirectly heated thermochemical conversion of fixed carbon feedstock components, (iii) heat integration and recovery, (iv) vapor and gas pressurization, and (v) vapor and gas clean-up and product recovery. A system and method for feedstock conversion includes a thermochemical reactor integrated with one or more hydrous devolatilization and solids circulation
(Continued)

subsystems configured to accept a feedstock mixture, comprised of volatile feedstock components and fixed carbon feedstock components, and continuously produce a volatile reaction product stream therefrom, while simultaneously and continuously capturing, transferring, and converting the fixed carbon feedstock components to syngas.

16 Claims, 4 Drawing Sheets (51) Int. Cl.
*C10B 53/00* (2006.01)
*C10B 49/22* (2006.01)
*C10K 3/06* (2006.01)
*C10K 1/02* (2006.01)
*C10B 53/02* (2006.01)
*C10J 3/62* (2006.01)
*C10J 3/48* (2006.01)
*C10G 1/02* (2006.01)

(52) U.S. Cl.
CPC .............. *C10B 53/02* (2013.01); *C10G 1/02* (2013.01); *C10J 3/482* (2013.01); *C10J 3/62* (2013.01); *C10K 1/026* (2013.01); *C10K 3/06* (2013.01); *C10J 2300/094* (2013.01); *C10J 2300/0916* (2013.01); *C10J 2300/0946* (2013.01); *C10J 2300/0976* (2013.01); *C10J 2300/0993* (2013.01); *C10J 2300/0996* (2013.01); *C10J 2300/1246* (2013.01); *C10J 2300/1807* (2013.01); *C10J 2300/1884* (2013.01); *C10J 2300/1892* (2013.01); *Y02E 50/10* (2013.01); *Y02P 20/145* (2015.11)

(56) References Cited

U.S. PATENT DOCUMENTS

| | | | |
|---|---|---|---|
| 5,439,491 | A | 8/1995 | Kubiak |
| 8,173,044 | B1 * | 5/2012 | Cheiky ................ C01B 3/34 |
| | | | 252/373 |
| 8,841,495 | B2 * | 9/2014 | Marker ................ C10G 1/06 |
| | | | 201/31 |
| 2004/0182000 | A1 | 9/2004 | Mansour et al. |
| 2009/0151250 | A1 | 6/2009 | Agrawal |
| 2009/0300976 | A1 | 12/2009 | Mansour et al. |
| 2010/0162625 | A1 | 7/2010 | Mills |
| 2010/0222620 | A1 | 9/2010 | O'Connor et al. |
| 2010/0270505 | A1 | 10/2010 | Gallaspy et al. |
| 2011/0154720 | A1 | 6/2011 | Bartek et al. |

FOREIGN PATENT DOCUMENTS

| | | | | |
|---|---|---|---|---|
| GB | 1395953 | | 5/1975 | |
| WO | WO 2007/127679 | | 11/2007 | |
| WO | WO 2010124077 | A2 * | 10/2010 | ............ C01B 3/34 |
| WO | WO-2010124077 | A2 * | 10/2010 | ............ C01B 3/34 |

OTHER PUBLICATIONS

International Search Report dated Mar. 8, 2013 issued in PCT counterpart application (No. PCT/US2012/063605).
Written Opinion dated Mar. 8, 2013 issued in PCT counterpart application (No. PCT/US2012/063605).
International Preliminary Report on Patentability (IPRP) dated Feb. 3, 2014 issued PCT counterpart application (No. PCT/US2012/063605) which includes Article 19 claims on "substitute sheets".
Official action dated Oct. 9, 2015 issued in Chinese counterpart application (No. 201280065846.2) with English translation.
Official action dated Jul. 9, 2018, issued in Chinese application (No. 201610411029.8).

* cited by examiner

SYSTEM AND METHOD FOR FLEXIBLE CONVERSION OF FEEDSTOCK TO OIL AND GAS

RELATED APPLICATIONS

This is a 35 USC 371 U.S. National Phase of International Application No. PCT/US2012/063605, filed Nov. 5, 2012 and published in English as WO 2013/067532A1 on May 10, 2013. The present application claims priority to U.S. Provisional Patent Application No. 61/556,048 filed Nov. 4, 2011.

FIELD OF THE INVENTION

The current invention is directed towards a continuous, scalable, feedstock flexible, cost-effective, energy integrated, feedstock-to-crude oil and syngas conversion process and apparatus comprising: continuous indirectly heated hydrous devolatilization of volatile feedstock components; continuous indirectly heated thermochemical carbon conversion of fixed carbon feedstock components; heat integration and recovery; vapor and gas pressurization; and, vapor and gas clean-up and product recovery.

The current invention also is directed towards a feedstock conversion system comprised of one or more hydrous devolatilization and solids circulation subsystems integrated together with a thermochemical reactor that act in cooperation to accept a feedstock mixture, comprised of volatile feedstock components and fixed carbon feedstock components, and continuously produce a volatile reaction product stream from the volatile feedstock components, while simultaneously and continuously capturing and transferring the fixed carbon feedstock components to a reactor where they may be continuously thermochemically reacted and converted into syngas. The two product streams are useful in producing fuels, power and chemicals.

BACKGROUND OF THE INVENTION

There are many biological and chemical platforms to convert biomass into valuable products; however, most of these technologies can only convert a narrow range of biomass types into a limited number of products. In contrast, the thermochemical platform can convert a broad spectrum of carbonaceous feedstock (biomass, energy crops, agri-waste, animal waste, refuse derived fuel or RDF, etc.) into a wide range of downstream value-added products. In the thermochemical domain, there exist many processes such as pyrolysis, thermal depolymerization, catalytic cracking, gasification, synthesis and upgrading and hybrid processes such as gasification and fermentation for converting feedstocks into fuels, power and chemicals. Scalability, feedstock flexibility, cost effectiveness (capital and operating and maintenance costs), catalyst type, integrity, cost and life (in case of catalytic processes), less than satisfactory product attributes (quality, stability, acidity and impurity, for example with some pyrolysis bio-oils) etc. are factors that hamper the commercialization and deployment of many of these technologies. To foster the development and growth of sustainable regional economies, there is a need for a process and apparatus that addresses the following:

Feedstock availability, variability, quality and cost—feedstock cost has a direct and significant impact on the return on investment (ROI) and so the higher this cost the lower the ROI. Higher capacity feedstock conversion systems tend to be generally more cost-effective due to scale but require access to large feedstock supply. Feedstock availability increases with distance from the site but transportation cost increases with distance as well resulting in higher feedstock cost for larger feedstock throughput units. Feedstocks of interest here (biomass, energy crops, agri-waste, animal waste, refuse derived fuel or RDF, etc.) tend to vary in quality, composition and availability with time (seasonally, monthly, weekly or daily depending upon the type) and this poses problems for systems designed for a specific feedstock. This renders it beneficial for a process or system that permits simultaneous processing of multiple feedstocks and also at smaller scales (say 20 to 250 ton per day feedstock throughput).

Simplicity of feed system—many thermochemical systems operate at elevated pressure and in some cases at elevated temperature as well and require a feed system that can provide a good seal against process gas backflow or leak into the ambient via the feed bin. This has implications for feed system selection, complexity, reliability, availability and cost. This renders it beneficial to operate at slightly below ambient pressure in the feed zone.

Continuous process—this is preferred to batch type process for improved economics.

Intermediates production—Fuel and/or chemical production systems generally are more cost effective at larger scale; however, feedstock availability and cost restrict the feedstock conversion system to smaller scale. A prudent approach then is to produce chemical intermediates of higher value than the feedstock in the front end for subsequent processing at larger scale to the final product.

Product attributes—the higher the quality, stability, integrity, and purity of the intermediates produced, the higher the marketability and revenue, and in turn the viability of the system.

Catalyst—catalysts facilitate process operation at milder conditions and improve process performance but are subject to degradation via poisoning, deactivation, attrition, pore plugging, etc. This affects catalyst integrity and life and in turn adds operating cost; disposal of the contaminant laden or spent catalyst can be an issue and can entail a disposal cost. The more exotic the catalyst, the higher the capital and operating costs. This renders it beneficial to operate without a catalyst or at best with a very inexpensive and disposable catalyst.

SUMMARY OF THE INVENTION

In one aspect, the present invention is directed to an energy integrated, continuous feedstock-to-crude oil and syngas conversion process comprising the following steps and components:

(1) continuous indirectly heated hydrous devolatilization of volatile portion of feedstock; (2) continuous indirectly heated thermochemical conversion of non-volatile carbonaceous portion of feedstock; (3) heat integration and recovery; (4) vapor and gas pressurization; (5) vapor and gas clean-up and product recovery.

The continuous hydrous devolatilization process is preferably carried out at slightly below atmospheric pressure (0.65 to 1 bar or 9.5 to 14.5 psia) and moderate temperature (320 to 569.99° C., depending upon the feedstock chemistry). This affords the luxury of: (1) minimizing feedstock delivery system complexity and capital cost attributed to the requirement to seal against gas backflow; and, (2) maximizing volatile reaction product quality and release rate to maximize crude oil production. In other non-limiting embodiments, the continuous hydrous devolatilization process may be carried out at higher pressures (0.65 to 2 bar or 9.5 to 29 psia). The char generated in the process is thermochemically converted via steam reforming and partial oxidation reactions at an elevated temperature (500 and 1400 degrees ° C., depending upon the char properties and feedstock chemistry) to generate syngas. The continuous thermochemical conversion process is preferably carried out at slightly below atmospheric pressure (0.65 to 1 bar or 9.5 to 14.5 psia). However, in other non-limiting embodiments, the continuous thermochemical conversion process may be carried out at elevated pressures (0.65 to 2 bar or 9.5 to 29 psia). Particle separators, such as cyclones, are utilized in stages to separate solid particulates from gaseous vapor streams. The volatile reaction product and syngas streams are preferably each cooled separately, as necessary to above the dew point of any condensable vapors they may contain, and either separately or combined and routed for pressurization to slightly above atmospheric pressure. The operating pressure ratio preferentially ranges between 1.5 and 3, and more preferentially ranges between 2 and 2.5. A steam jet ejector is preferred but mechanical compression devices, such as rotary blowers, gear pumps, reciprocating piston devices may be used; however, from an operational standpoint, steam jet ejectors are preferred due to lack of moving parts and excellent continuous operational stability and reliability. The streams then are transferred either separately or in combined mode through solids removal and gas cleaning steps to capture fine particulates, condense the hydrocarbon volatiles into crude oil, and capture one or more of other contaminants present including but not limited to HCl, HCN, $NH_3$, $H_2S$, and COS. The end products are crude oil and syngas which, the latter being rich in $H_2$ and CO, may be used in a wide array of downstream syngas processing technologies including, but not limited to: fuel ethanol production using catalytic or anaerobic fermentation processes; electricity generation via gas turbine or fuel cell or gas engines; Fischer-Tropsch synthesis for production of waxes and synthetic diesel fuel; hydrogen production utilizing pressure swing adsorption or membrane systems; or, chemicals production.

Separating the overall conversion process into devolatilization and thermochemical conversion steps facilitates the following: (1) rapid and excellent mixing of feedstock and bed solids thus promoting fast devolatilization of volatile feedstock components resulting in greater volatile yield; and, (2) improved and faster carbon conversion due to reduced concentration and partial pressure of species such as $H_2$ and CO in the thermochemical reactor which tend to inhibit char reaction kinetics.

In another aspect, the present invention is directed towards a feedstock conversion system having thermochemical reactor integrated with one or more hydrous devolatilization and solids circulation systems configured to accept a feedstock mixture, comprised of volatile feedstock components and fixed carbon feedstock components, and continuously produce a volatile reaction product stream therefrom, while simultaneously and continuously capturing, transferring, and converting the fixed carbon feedstock components to syngas.

The feedstock conversion system comprises: a reactor having a fluid bed; a dense-phase solids transport conduit connected at a first end to the fluid bed of the reactor and at a second end to a devolatilization chamber; said dense-phase bed solids transport conduit configured to convey bed solids from the reactor to said devolatilization chamber; said devolatilization chamber connected at a first end to the dense-phase bed solids transport conduit and at a second end to a riser; said devolatilization chamber configured to receive a feedstock and fluidization media; said riser connected at a first end to said devolatilization chamber and at a second end to a coarse separation device; said riser configured to convey bed solids and volatile reaction products to the coarse separation device; said coarse separation device is also connected to a coarse separation device discharge conduit and to a coarse separation device dipleg; said coarse separation device, configured to accept said bed solids and said volatile reaction products, and in response output a coarse mixed stream via a coarse separation device discharge conduit, the coarse mixed stream comprising a volatile reaction products and char; said coarse separation device discharge conduit is connected at a first end to said coarse separation device and at a second end to a fine separation device; said fine separation device is also connected to a fine separation device discharge conduit and to a fine separation device dipleg; said coarse separation device discharge conduit is configured to transport the coarse mixed stream to said fine separation device; said fine separation device, configured to accept said coarse mixed stream, and in response output a fine mixed stream via a fine separation device discharge conduit, the fine mixed stream comprising volatile reaction products; said fine separation device configured to receive a said coarse mixed stream, and in response separate a char stream therefrom which is conveyed to the reactor via a fine separation device dipleg; said fine separation device dipleg is connected at a first end to the fine separation device and at a second end to the reactor, the fine separation device dipleg is configured to convey the separated char stream from the fine separation device to the reactor; said coarse separation device is configured to receive a mixture of said bed solids and said volatile reaction products and separate said mixture into an intermediate solids mixture which is conveyed to the dense fluid bed of the reactor; a coarse separation device dipleg is connected at a first end to the coarse separation device and at a second end to the reactor, the coarse separation device dipleg is configured to convey the intermediate solids mixture from the coarse separation device to the dense fluid bed of the reactor; a gas-solids flow regulator interposed between said coarse separation device dipleg's first end connected to coarse separation device and said coarse separation device dipleg's second end to the reactor; said reactor, configured to receive a said intermediate solids mixture and, in response to said intermediate solids mixture, output a particulate-laden syngas stream via a reactor discharge conduit; said reactor includes heating conduits to supply some or all of the endothermic heat of reaction for the steam reforming process; said reactor containing a primary cyclone providing internal solids recycle into the reactor to retain bed solids and enhance carbon conversion; an optional secondary cyclone separates fly ash solids from the particulate-laden syngas stream; wherein: the dense-phase bed solids transport conduit, the devolatilization chamber, the riser, the coarse separation device, the coarse separation device dipleg, the gas-solids flow regulator, the coarse separation device discharge conduit, the fine separation device, the fine separation device dipleg, and the fine separation device discharge conduit, together form a hydrous devolatilization and solids circulation subsystem.

DEFINITIONS

Before the disclosed process is described, it is to be understood that the aspects described herein are not limited to specific embodiments, apparatus, or configurations, and as such can, of course, vary. It is also to be understood that the terminology used herein is for the purpose of describing particular aspects only and, unless specifically defined herein, is not intended to be limiting.

As used herein the term "carbonaceous feedstock" is a material that has "fixed carbon feedstock components" and "volatile feedstock components".

As used herein the term "fixed carbon feedstock components" refers to feedstock components present in a carbonaceous feedstock other than volatile feedstock components, contaminants, ash or moisture. Fixed carbon feedstock components are usually solid combustible residue remaining after the removal of moisture and volatile feedstock components from a carbonaceous feedstock.

As used herein the term "volatile feedstock components" refers to components within a carbonaceous feedstock other than fixed carbon feedstock components, contaminants, ash or moisture.

As used herein the term "syngas" refers to a gaseous mixture containing carbon monoxide (CO), hydrogen ($H_2$), and other vapors/gases, also including char, if any and usually produced when a carbonaceous material reacts with steam ($H_2O$), carbon dioxide ($CO_2$) and/or oxygen ($O_2$).

As used herein the term "volatile reaction products" refers to vapor or gaseous non-polar organic species that were once present in a solid or liquid state as volatile feedstock components of a carbonaceous feedstock wherein their conversion or vaporization to the vapor or gaseous state was promoted by the process of hydrous devolatilization. Volatile reaction products may contain both, noncondensable species, and condensable species which are desirable for collection and refinement.

As used herein the term "hydrous devolatilization" refers to an endothermic thermochemical process wherein volatile feedstock components of a carbonaceous feedstock are converted primarily into volatile reaction products in a steam and hydrogen environment; however some syngas can be generated. Typically this sub classification of a thermochemical process involves the use of steam as a fluidization medium and involves temperatures ranging from 320 and 569.99° C., depending upon the feedstock chemistry. Hydrous devolatilization permits release and thermochemical reaction of volatile feedstock components leaving the fixed carbon feedstock components mostly unreacted as dictated by kinetics.

As used herein the term "steam reforming" refers to a thermochemical process comprising a specific chemical reaction where steam reacts with a carbonaceous feedstock to yield syngas. The main reaction is endothermic wherein the operating temperature range is between 570 and 900° C., depending upon the feedstock chemistry.

As used herein the term "partial oxidation" refers to a thermochemical process wherein substoichiometric oxidation of a carbonaceous feedstock takes place to generate syngas. By limiting the amount of oxygen available, the main reaction is exothermic wherein the operating temperature range is between 500 and 1400° C., depending upon the feedstock chemistry.

The disclosed process can be configured by the formulator to meet the desired need. The disclosed process provides several unmet advantages to convert varying types of carbonaceous feedstocks into valuable end products.

BRIEF DESCRIPTION OF THE DRAWINGS

For a better understanding of the present invention and to show how the same may be carried out in practice, reference will now be made to the accompanying drawings, in which.

DETAILED DESCRIPTION

Reactor

Figure 1:
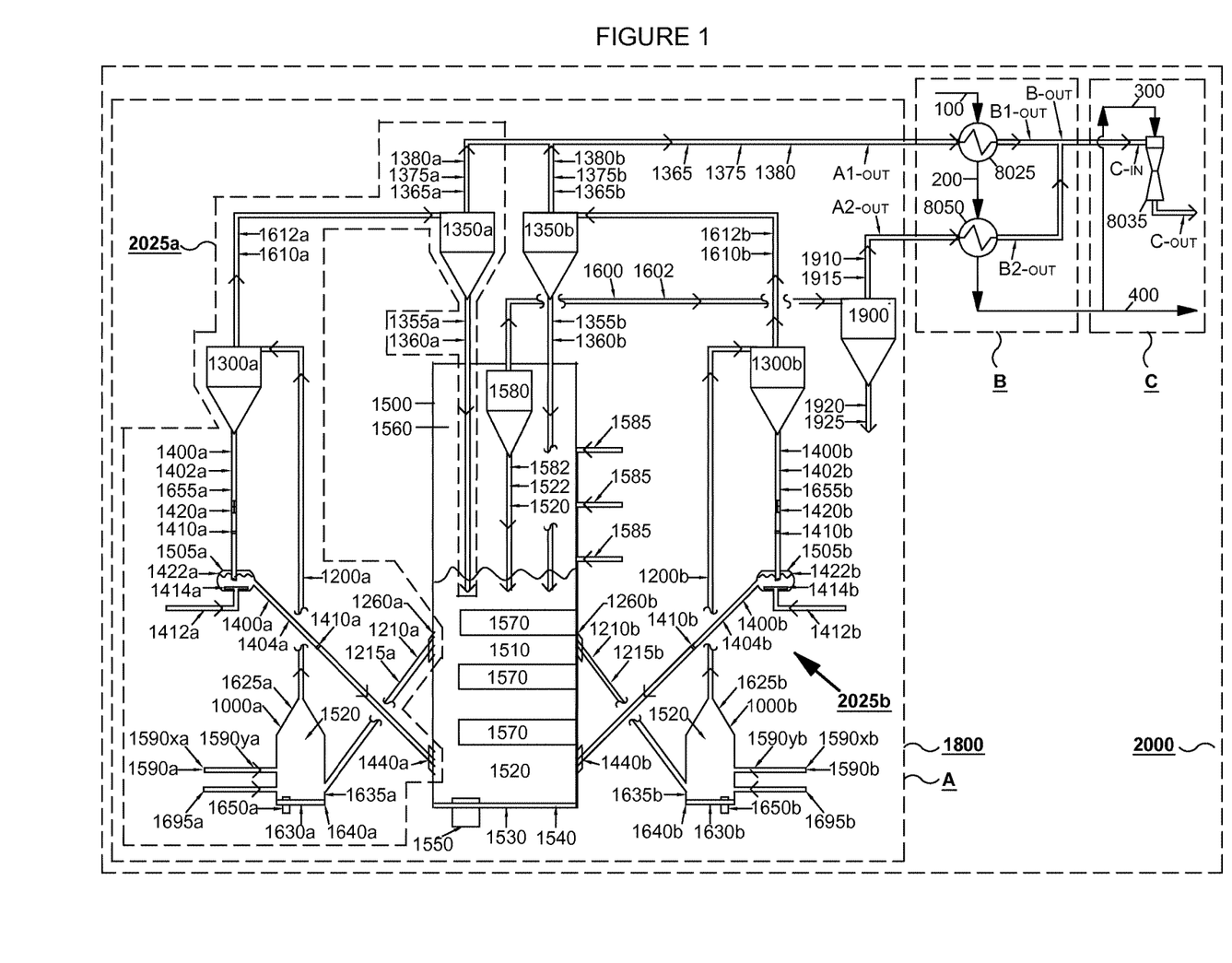
FIG. 1 shows a continuous energy integrated feedstock-to-crude oil conversion process comprised of a feedstock conversion system that includes an indirectly heated thermochemical reactor and two hydrous devolatilization and solids circulation subsystems, integrated together with a heat integration and recovery system, and a vapor and gas pressurization system in accordance with one embodiment of the present invention.

FIG. 1 illustrates an energy integrated continuous feedstock-to-crude oil conversion process (2000) comprised of three process sequence steps: Sequence Step A, Hydrous Devolatilization and Thermochemical Conversion (A); Sequence Step B, Heat Removal and Recovery (B); and, Sequence Step C, Vapor and Gas Pressurization (C). A fourth step, Sequence Step D, Vapor and Gas Clean-up and Product Recovery (D) is not shown but can be implemented using systems and methods known to those skilled in the art.

The preferred embodiment, as depicted in FIG. 1, illustrates Sequence Step A, Hydrous Devolatilization and Thermochemical Conversion (A) comprising a feedstock conversion system (1800) that includes a reactor (1500) and a first and second hydrous devolatilization and solids circulation subsystem (2025*a* & 2025*b*).

The preferred embodiment of Sequence Step B, Heat Removal and Recovery (B) includes a sharing of heat, in the form of steam (200), generated from a water source (100), between a reaction product heat recovery steam generator (HRSG) (8025) and a syngas heat recovery steam generator (HRSG) (8050) followed by the joining of Sequence Step B Reaction Product Discharge (B1-OUT) with Sequence Step B Syngas Discharge (B2-OUT) to form a Sequence Step B Combined Syngas and Reaction Product Discharge (B-OUT).

The preferred embodiment of Sequence Step C, Vapor and Gas Pressurization (C) includes providing the Sequence Step B Combined Syngas and Reaction Product Discharge (B-OUT) to a steam jet ejector (8035) together with at least a portion of the steam (300) generated in Sequence Step B to provide the negative pressure required for Sequence Step A. Excess steam (400) generated in the system can be used for other purposes.

As illustrated in FIG. 1, the feedstock conversion system (1800) includes a reactor (1500) integrated together with a first and second hydrous devolatilization and solids circulation subsystem (2025*a* & 2025*b*) which cooperate to realize the continuous devolatilization of first and second volatile feedstock components (1590*ya* & 1590*yb*) within a first feedstock (1590*a*) and a second feedstock (1590*b*) and allow for continuous capture, transference and conversion of the fixed carbon feedstock components (1590*xa* & 1590*xb*)

into syngas in the reactor (1500). The numerical identifier 1590x signifies the "fixed carbon feedstock components" within a carbonaceous feedstock (1590). The numerical identifier 1590xa signifies the "fixed carbon feedstock components" within a first carbonaceous feedstock (1590x). The numerical identifier 1590xb signifies the "fixed carbon feedstock components" within a second carbonaceous feedstock (1590x). The numerical identifier 1590y signifies the "volatile feedstock components" within a carbonaceous feedstock (1590). The numerical identifier 1590ya signifies the "volatile feedstock components" within a first carbonaceous feedstock (1590). The numerical identifier 1590yb signifies the "volatile feedstock components" within a second carbonaceous feedstock (1590).

With two hydrous devolatilization and solids circulation subsystems (2025a & 2025b), the conversion system is capable of handling different feedstocks (1590a, 1590b), one input to each devolatilization chamber (1000a, 1000b). The feedstocks may differ in throughput, composition and moisture content. In addition, due to the presence of separate devolatilization chambers (1000a, 1000b), separate coarse separation devices (1300a, 1300b) and separate fine separation devices (1300a, 1300b), the different feedstocks may be subject to separate sets of processing conditions. This maximizes hydrous devolatilization of the different volatile feedstock components (1590ya, 1590yb) into volatile reaction products (1375a, 1375b).

Each hydrous devolatilization and solids circulation subsystem (2025a & 2025b) is comprised of a dense-phase solids transport conduit (1215a & 1215b), a devolatilization chamber (1000a & 1000b), a riser (1200a & 1200b), a coarse separation device (1300a & 1300b), a coarse separation device discharge conduit (1612a & 1612b), a coarse separation device dipleg (1400a & 1400b), a gas-solids flow regulator (1505a & 1505b), a fine separation device (1350a & 1350b), a fine separation device discharge conduit (1365a & 1365b), and a fine separation device dipleg (1355a & 1355b).

In one embodiment, the reactor (1500) is a thermochemical reactor to carry out steam reforming and/or partial oxidation reactions. The reactor (1500) may be a fluidized bed of a circulating, turbulent, entrained flow, or bubbling type and with or without indirect heating means. FIG. 1 shows one embodiment of a reactor (1500) taking the form of an indirectly heated thermochemical reactor. The reactor (1500) contains a dense fluid bed (1510) including bed solids (1520), a fluidization media (1530) supplied through a fluidization media distributor (1540), a solids drain system (1550), heating conduits (1570) which may be, for example, heat pipes, pulse heater tailpipes, electrical heater rods in thermowells, or a heat exchanger, a freeboard zone (1560), and a primary cyclone (1580). The fluidization media (1530) that enters through the fluidization media distributor (1540) may comprise an oxygen-containing gas such as air, enriched air, oxygen, steam, $CO_2$, $N_2$, or a mixture thereof. The dense fluid bed (1510) may contain inert material or catalyst or sorbent or engineered particles. The engineered particles may be made of alumina, zirconia, sand, olivine sand, limestone, dolomite, or catalytic materials, any of which may be hollow in form, such as microballoons or microspheres. These engineered particles enhance mixing, heat and mass transfer, and reaction between the fluidization media (1530) and the fixed carbon feedstock components (1590x), also known as char, returned to the reactor (1500) from the hydrous devolatilization and solids circulation subsystem (2025a & 2025b). The preferred bed solids are alumina microspheres. In some embodiments, the bed solids include Geldart Group A or Group B particles.

The reactor (1500) dense fluid bed (1510) temperature may range between 500 and 1400° C., depending upon the reactivity, size and ash fusion characteristics of the fixed carbon feedstock components (1590x) returned to the dense fluid bed (1510) from the solids circulation system.

The freeboard zone (1560) provides an entrained solids flow zone to improve carbon conversion. Preferably the freeboard zone (1560) operates in an auto-thermal or partial oxidation mode to convert the carbon in the char to a product gas that may contain CO, $CO_2$, $H_2$, $H_2O$, and other gases. The reactor (1500) freeboard zone (1560) pressure may range from 0.65 to 2 bar or 9.5 to 29 psia depending upon the partial oxidation efficiency requirements within the freeboard zone (1560) and the pressure coupling between the reactor (1500) and the devolatilization chamber (1000a & 1000b). Multiple reactant fluid addition stages (1585) in the freeboard zone (1560), above the dense fluid bed (1510), may be included to enhance intimate gas-solid contact and promote carbon conversion reactions. The reactant fluid added through stages (1585) may include air, enriched air, oxygen, steam or a mixture thereof.

In the embodiment shown in FIG. 1, the primary cyclone (1580) is located internal to the reactor (1500) freeboard zone (1560). In other embodiments (not shown), the primary cyclone (1580) may be located external to the reactor (1500) freeboard zone (1560). In some embodiments, some other particle separation device is used in lieu of one or more of the cyclones used in the feedstock conversion system (1800).

The primary cyclone (1580) is connected to a reactor discharge conduit (1602) and to a primary cyclone dipleg (1582). The primary cyclone (1580) is configured to accept gas and solids from the freeboard zone (1560) and in response output a particulate-laden syngas stream (1600) via a reactor discharge conduit (1602). Char (1522) and bed solids (1520) are recycled back to the dense fluid bed (1510) via a primary cyclone dipleg (1582) wherein the char (1522) may be converted within the reactor (1500) and the bed solids (1520) may be reused. The particulate-laden syngas stream (1600) is comprised of syngas and fly ash solids (1920).

The reactor discharge conduit (1602) is connected at a first end to the primary cyclone (1580) and at a second end to a secondary cyclone (1900). The secondary cyclone (1900) is also connected to a secondary cyclone discharge conduit (1915) and to a secondary cyclone dipleg (1925). The secondary cyclone (1900) is configured to accept the particulate-laden syngas stream (1600), and in response output a particulate-depleted syngas stream (1910), or a Sequence Step A Syngas Discharge (A2-OUT), via a secondary cyclone discharge conduit (1915). The particulate-depleted syngas stream (1910) is primarily comprised syngas and is depleted of fly ash solids (1920). Fly ash solids (1920) are separated from particulate-laden syngas stream (1600) and are conveyed from the system via a secondary cyclone dipleg (1925).

It is to be understood that in some cases the secondary cyclone discharge conduit (1915), the particulate-depleted syngas stream (1910), and the secondary cyclone (1900), may not be required to realize a Sequence Step A Syngas Discharge (A2-OUT).

Hydrous Devolatilization and Solids Circulation

Bed solids (1520) within the reactor (1500) are conveyed through the dense-phase solids transport conduit (1215a & 1215b) where they enter the devolatilization chamber (1000a & 1000b) and merge with a feedstock (1590a & 1590b) and fluidization media (1630a & 1630b) prior to entering a riser (1200a & 1200b) for conveyance to a coarse separation device (1300a & 1300b).

A dense-phase solids transport conduit (1215a & 1215b) is connected at a first end to the dense fluid bed (1510) of the reactor (1500) and at a second end to a devolatilization chamber (1000a & 1000b).

As seen in the embodiment of FIG. 1, the dense-phase solids transport conduit (1215a & 1215b) preferably includes a downwardly declined transfer entrance section (1210a & 1210b) connected at one end to the devolatilization chamber (1000a & 1000b) and the other end to a reactor nozzle (1260a & 1260b) at the interface with the reactor (1500). The reactor nozzle (1260a & 1260b) and dense-phase solids transport conduit (1215a & 1215b) are preferably angled declining downwards so that gravity may assist conveyance of hot bed solids (1520) in a dense phase from the dense fluid bed (1510) and into the devolatilization chamber (1000a & 1000b). The reactor nozzle (1260a & 1260b) is located preferably in the upper part of the dense fluid bed (1510).

The devolatilization chamber (1000a & 1000b) is connected at a first end to the dense-phase solids transport conduit (1215a & 1215b) and at a second end to a riser (1200a & 1200b). The devolatilization chamber (1000a & 1000b) is preferably a refractory-lined pressure vessel, as with all the associated conduits, piping and equipment within the feedstock conversion system (1800), and contains bed solids (1520), a fluidization media (1630a & 1630b) supplied through a fluidization media distributor (1640a & 1640b), a solids drain system (1650a & 1650b), and is configured to receive a feedstock (1590a & 1590b), preferably a feedstock mixture, comprised of volatile feedstock components (1590y) and fixed carbon feedstock components (1590x). The fluidization media (1630a & 1630b) is preferably steam; however, it may also include recycled syngas, an oxygen-containing gas, such as air, enriched air, oxygen, $CO_2$, or an inert gas such as $N_2$, or mixtures thereof. Steam and/or recycled syngas is the preferred fluidization media (1630a & 1630b) to promote: (1) hydrogenation of contaminants such as chlorine, sulfur, or nitrogen in the feedstock and facilitate improved water solubility; (2) water-gas reactions; (3) deoxygenation to provide improved product quality, stability and purity; and, (4) reduction in the acidity of the condensible volatile hydrocarbon stream produced. The solids transferred from the reactor (1500) via conduit (1215a & 1215b) (i) supply the energy for sensible heating of the feedstock and for drying and devolatilizing the feedstock, and (ii) aid in manipulating the mean density and size of the combined solids or intermediate solids mixture (1655) so that it corresponds to Geldart Group A or Group B particles and flows relatively smoothly through the coarse separation device dipleg (1400a & 1400b). The fluidization media (1630a & 1630b) fluidizes and reacts and together with the vapors and gases generated therein entrains and conveys transferred solids and feedstock solid residue or char in a dilute-phase transport mode from the devolatilization chamber (1000a & 1000b) into the riser (1200a & 1200b) and to the coarse separation device (1300a & 1300b).

The devolatilization chamber (1000a & 1000b) is also configured to accept a sorbent (1695a & 1695b) including, but not limited to, earth metal oxides, such as sodium oxide ($Na_2O$), potassium oxide ($K_2O$), magnesium oxide ($MgO$) or calcium oxide ($CaO$), or the like to capture chlorine, sulfur or other contaminants. In one embodiment, sorbents may be added to the devolatilization chamber (1000a & 1000b) and the spent sorbent may be withdrawn and regenerated.

The purpose of the devolatilization chamber (1000a & 1000b) is to allow enhanced contact and mixing of the feedstock (1590a & 1590b), fluidization media (1630a & 1630b), optional sorbent (1695a & 1695b), and bed solids (1520) as well as to increase the residence time to maximize devolatilization of the volatile feedstock components (1590ya & 1590yb) to form volatile reaction products (1375a & 1375b). In one embodiment, the devolatilization chamber (1000a & 1000b) contains a conical-shaped reducer portion (1625a & 1625b) in the upper part to transition into the riser to facilitate a gradual change from dense phase flow to dilute phase transport flow. Feedstock (1590a & 1590b) is injected in the lower section of the constant cross-sectional portion (1635a & 1635b) of the devolatilization chamber (1000a & 1000b), near the same relative vicinity of the fluidization media distributor (1640a & 1640b); this section operates at relatively low velocity to permit greater residence time for larger feedstock particles to heat up, dry, and devolatilize. The devolatilization chamber (1000a & 1000b) temperature may range between 320 to 569.99° C., depending upon feedstock characteristics, generally increasing with an increase in feedstock fixed carbon content. The solids transfer rate via conduit (1215a & 1215b) will vary with feedstock characteristics, feed rate and the operating temperatures of the reactor (1500) and the devolatilization chamber (1000a & 1000b).

The riser (1200a & 1200b) is configured to convey a mixture of reacted feedstock (1590a & 1590b) components, fluidization media (1630a & 1630b), sorbent (1695a & 1695b), bed solids (1520), and volatile reaction products (1375a & 1375b) to a coarse separation device (1300a & 1300b). Volatile reaction products (1375a & 1375b) continue to be generated along the vertical length of the riser (1200a & 1200b) as the volatile feedstock components (1590ya & 1590yb) are volatilized by intimate contact with the hot bed solids (1520).

The coarse separation device (1300a & 1300b) is connected to a coarse separation device discharge conduit (1612a & 1612b) and to a coarse separation device dipleg (1400a & 1400b). The coarse separation device (1300a & 1300b) is configured to accept a mixture of solids, vapor and gas, and in response output a coarse mixed stream (1610a & 1610b) via a coarse separation device discharge conduit (1612a & 1612b). The coarse mixed stream (1610a & 1610b) comprises volatile reaction products (1375a & 1375b) and char.

The fine separation device (1350a & 1350b) is connected to a fine separation device discharge conduit (1365a & 1365b) and to a fine separation device dipleg (1355a & 1355b). The coarse separation device discharge conduit (1612a & 1612b) is configured to transport the coarse mixed stream (1610a & 1610b) to said fine separation device (1350a & 1350b). The fine separation device (1350a & 1350b) is configured to accept the coarse mixed stream (1610a & 1610b), and in response output a fine mixed stream (1380a & 1380b) via a fine separation device discharge conduit (1365a & 1365b), the fine mixed stream (1380a & 1380b) comprising volatile reaction products (1375a & 1375b). If the feedstock conversion system (1800) is equipped with more than one hydrous devolatilization and solids circulation subsystem (2025a & 2025b), each fine separation device discharge conduit (1365a & 1365b) may be joined together into a single fine separation device discharge conduit (1365) or a Sequence Step A Reaction Product Discharge (A1-OUT).

The fine separation device (1350a & 1350b) is configured to receive coarse mixed stream (1610a & 1610b), and in response separate a char stream (1360a & 1360b) therefrom which is conveyed to the reactor (1500) via a fine separation device dipleg (1355a & 1355b). The fine separation device dipleg (1355a & 1355b) is connected at a first end to the fine separation device (1350a & 1350b) and at a second end to the reactor (1500). The fine separation device dipleg (1355a & 1355b) is configured to convey the char stream (1360a & 1360b) separated from the coarse mixed stream (1610a & 1610b) to the reactor (1500).

Most or all of the volatile feedstock components (1590$ya$ & 1590$yb$) are reacted with the fluidization media (1630a & 1630b) and volatilized into volatile reaction products (1375a & 1375b) and discharged from the coarse separation device (1300a & 1300b). An intermediate solids mixture (1655a & 1655b) of the fixed carbon feedstock components (1590$xa$ & 1590$xb$), sorbent (1695a & 1695b), and bed solids (1520) are then conveyed from the coarse separation device (1300a & 1300b) to the reactor (1500) via a coarse separation device dipleg (1400a & 1400b).

The coarse separation device dipleg (1400a & 1400b) is connected at a first end to the coarse separation device (1300a & 1300b) and at a second end to the reactor (1500), and is configured to convey the intermediate solids mixture (1655a & 1655b) from the coarse separation device (1300a & 1300b) to the dense fluid bed (1510) of the reactor (1500).

As seen in FIG. 1, the coarse separation device dipleg (1400a & 1400b) includes a vertical dipleg upper section (1402a & 1402b) connecting to an angled dipleg lower section (1404a & 1404b) provided with a dipleg nozzle (1440a & 1440b) that is flush with the internal wall at the interface with the reactor (1500). The coarse separation device dipleg (1400a & 1400b) may include at least one or more strategically placed aeration port (1410a & 1410b), and the vertical dipleg upper section (1402a & 1402b) may include at least one or more specially designed slug breakers (1420a & 1420b), to avoid slug formation and the consequent unsteady solids down flow, and one or more expansion joints (not shown). Suitable nozzles, aeration ports and slug breakers are known to those skilled in the art, as exemplified by U.S. Patent Publication No. 2012/0111109A1, also WO 2012/061742A1.

In one embodiment, a gas-solids flow regulator (1505a & 1505b) is interposed between the vertical dipleg upper section (1402a & 1402b) and the angled dipleg lower section (1404a & 1404b). The gas-solids flow regulator (1505a & 1505b) is equipped with a fluidization media distributor (1414a & 1414b) configured to accept a fluidization media (1412a & 1412b) which may comprise steam, recycled syngas, $CO_2$, $N_2$, or a mixture thereof; however, steam or recycled syngas is preferred. The fluidization media distributor (1414a & 1414b) may be biased in the sense that it preferentially provides a greater flow of fluidization media (1412a & 1412b) to the vicinity closer to the angled dipleg lower section (1404a & 1404b) than near the vertical dipleg upper section (1402a & 1402b). It is preferred to have a greater superficial fluidization velocity nearby the vicinity where the angled dipleg lower section (1404a & 1404b) conveys the intermediate solids mixture (1655a & 1655b) from the vessel and to the reactor (1500) in relation to the vicinity within the vessel where the intermediate solids mixture (1655a & 1655b) is transferred to the vessel from the coarse separation device (1300a & 1300b); this is because downward transference of solids is improved with increased fluidization, and gas bypassing up the vertical dipleg upper section (1402a & 1402b) is minimized with a lesser fluidization velocity. Typically, the superficial fluidization velocity may range from slightly less than minimum fluidization velocity to less than two times the minimum fluidization velocity. The fluidization media (1412a & 1412b) allows the intermediate solids mixture (1655a & 1655b) to flow in a dense-phase transport mode en route to the reactor (1500), thus improving solids transfer while circumventing the propensity for clogging and slug flow. This also aids in minimizing gas leakage or backflow from the reactor (1500) through the coarse separation device (1300a & 1300b). It is preferable to maintain a constant level (1422a & 1422b) of solids within the gas-solids flow regulator (1505a & 1505b) by regulating fluidization and aeration flow rates to ensure steady flow of intermediate solids mixture (1655a & 1655b) into the reactor (1500). It is also preferable that the vertical dipleg upper section (1402a & 1402b) is disposed within the gas-solids flow regulator (1505a & 1505b) to transfer the intermediate solids mixture (1655a & 1655b) beneath the constant level (1422a & 1422b) of solids to minimize gas bypassing up the vertical dipleg upper section (1402a & 1402b). It is also preferable to transfer the intermediate solids mixture (1655a & 1655b) from the vertical dipleg upper section (1402a & 1402b) into the gas-solids flow regulator (1505a & 1505b) such that the opening in the vertical dipleg upper section (1402a & 1402b) points away from the angled dipleg lower section (1404a & 1404b); this is to further minimize gas bypassing up the vertical dipleg upper section (1402a & 1402b).

System Flow Chart

Figure 2:
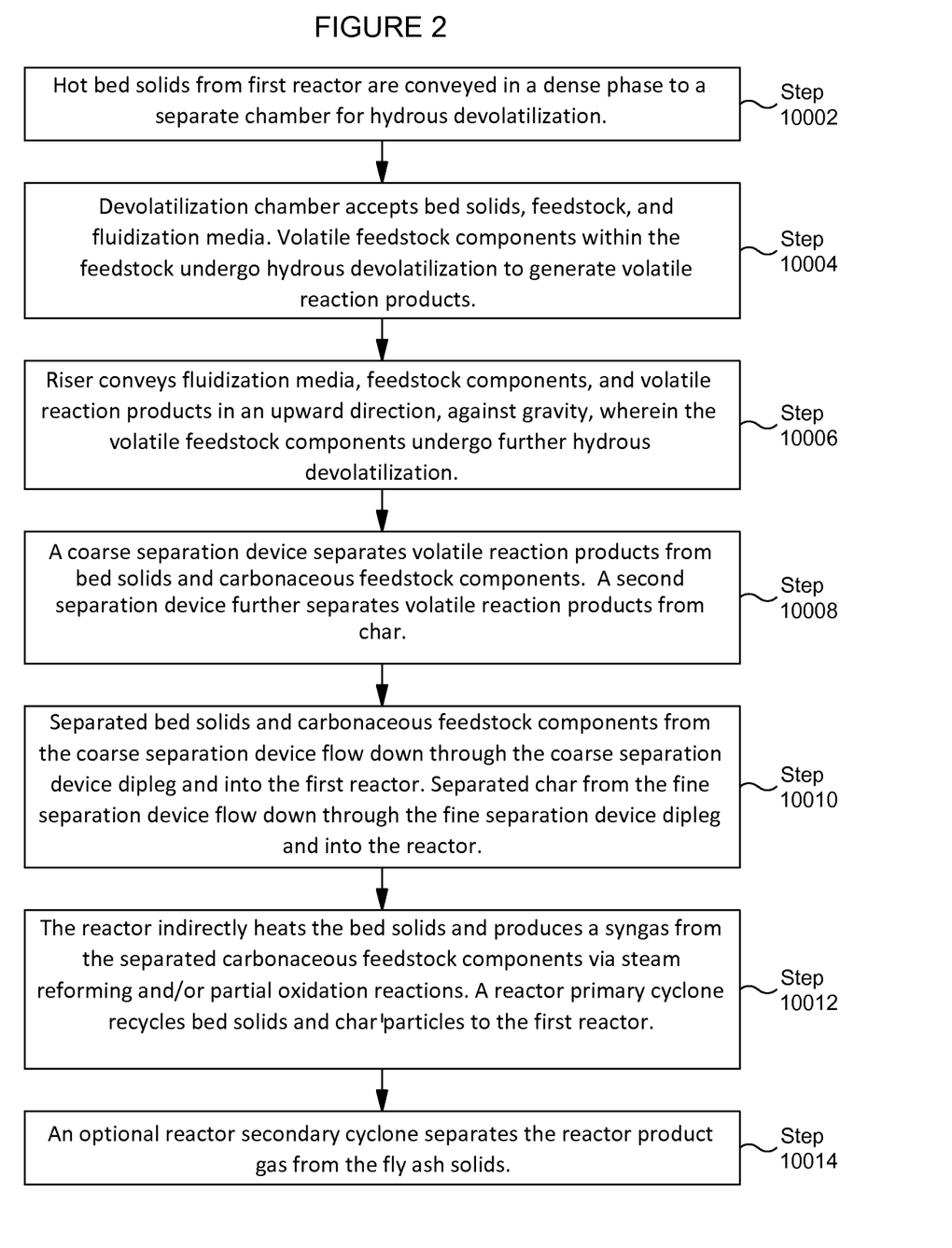
FIG. 2 shows a flow chart of high level operations in the feedstock conversion system with regard to the thermochemical reactor and the hydrous devolatilizer and solids circulation subsystem in accordance with one embodiment of the present invention.

FIG. 2 shows a flow chart depicting the process for a single second hydrous devolatilization and solids circulation subsystem (2025a) integrated with one reactor (1500) to create volatile reaction products and syngas.

In step 10002, hot bed solids (1520) within the reactor (1500) are conveyed through a dense-phase bed solids transport conduit (1215a) where they enter the devolatilization chamber (1000a).

In step 10004, the devolatilization chamber (1000a) accepts a fluidization media (1630a) and a feedstock (1590a), preferentially a feedstock mixture, comprised of volatile feedstock components (1590$ya$) and fixed carbon feedstock components (1590$xa$), such as unsorted plastic and carbonaceous refuse derived fuel (RDF), municipal solid waste (MSW), or a mixture of plastic materials, medical waste, sewage sludge, animal waste such as poultry litter, swine waste etc. or other complex organic materials and carbonaceous materials. In response to the hot bed solids (1520) from the reactor (1500) and the fluidization media (1630a), the volatile feedstock components (1590$ya$) undergo hydrous devolatilization thus in turn generating volatile reaction products (1375a).

In step (10006), the solids, reactants and volatile reaction products are conveyed in an upward direction, against gravity, through the riser (1200a), wherein hydrous devolatilization reactions continue to completion, or near completion, thus forming volatile reaction products (1375a).

In step (10008), a coarse separation device (1300a) separates a coarse mixed stream (1610a) comprising volatile reaction products (1375a) and fixed carbon feedstock components (1590$xa$) to form an intermediate solids mixture (1655a) comprising bed solids (1520) and fixed carbon feedstock components (1590$xa$). Further, a fine separation device (1350a) further separates volatile reaction products (1375a) from a char stream (1360a).

In step (10010) the separated intermediate solids mixture (1655a) flows down through the coarse separation device dipleg (1400a) and into the reactor (1500) and a separated char stream (1360a) from the fine separation device (1350a) flows down through the fine separation device dipleg (1355a) and into the reactor (1500).

In step (10012), the reactor (1500) produces a particulate-laden syngas stream (1600) from the separated fixed carbon feedstock components (1590xa) via steam reforming and/or partial oxidation reactions. Further, a primary cyclone (1580) recycles bed solids (1520) and char (1522) to the reactor (1500).

In optional step (10014), an optional secondary cyclone (1900) separates the particulate-depleted syngas stream (1910) from the fly ash solids.

Alternate System Configurations

Figure 3:
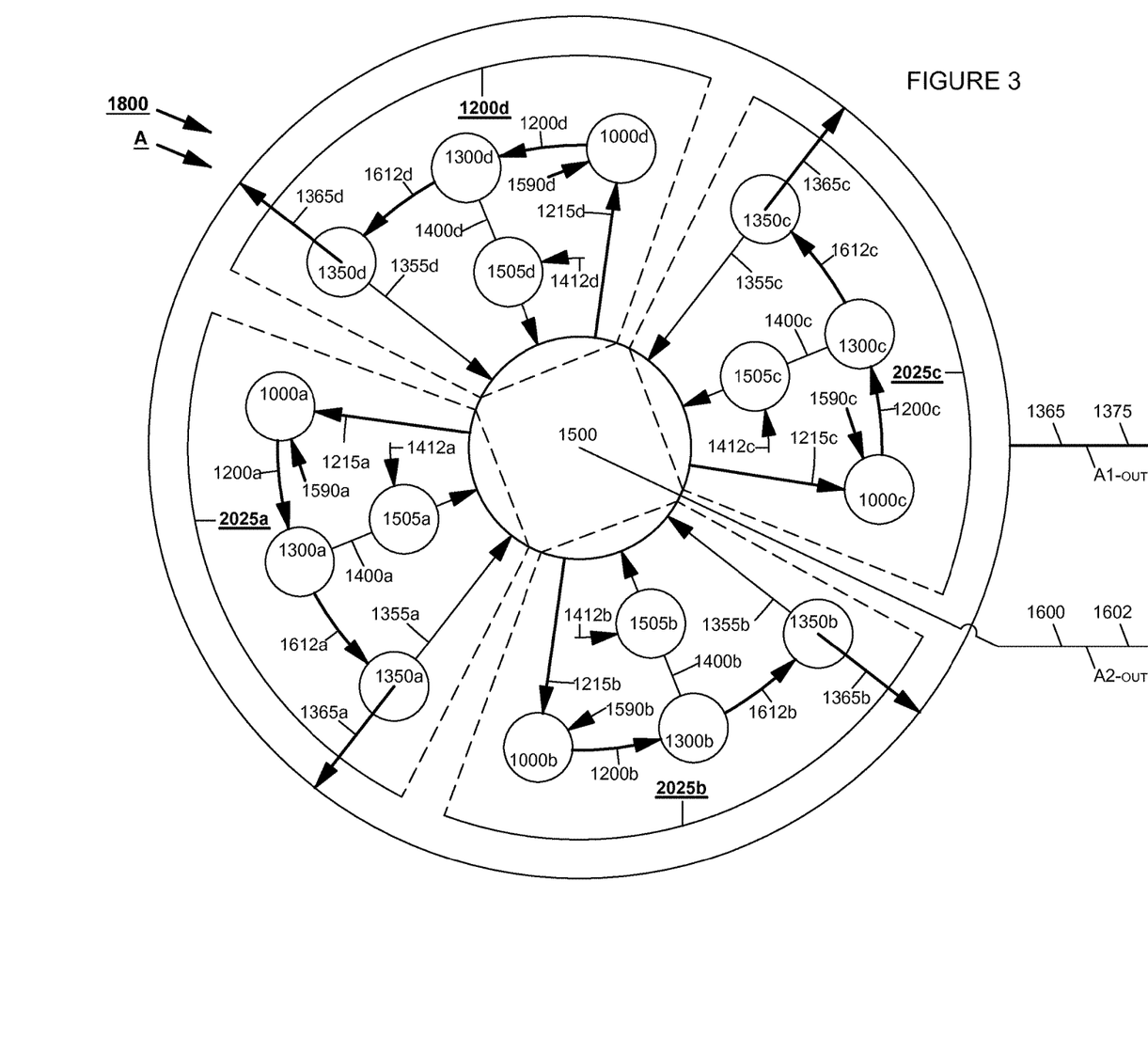
FIG. 3 shows a feedstock conversion system including a thermochemical reactor integrated with a plurality of hydrous devolatilization and solids circulation subsystem in accordance with one embodiment of the present invention.

FIG. 3 illustrates another embodiment of the feedstock conversion system (1800) including an indirectly heated thermochemical reactor (1500), and a plurality of hydrous devolatilization and solids circulation subsystems (2025a & 2025b & 2025c & 2025d).

Like the embodiment described in FIG. 1, the embodiment depicted in FIG. 3 includes a reactor (1500) that outputs a particulate-laden syngas stream (1600), or a Sequence Step A Syngas Discharge (A2-OUT), by reacting the fixed carbon feedstock components (1590x). However, the feedstock conversion system (1800) depicted in FIG. 3 depicts four hydrous devolatilization and solids circulation subsystems (2025a & 2025b & 2025c & 2025d) integrated together with one common reactor (1500).

Each separate devolatilization chamber (1000a & 1000b & 1000c & 1000d) may accept its own feedstock (1590a & 1590b & 1590c & 1590d), and separately volatilize and generate volatile reaction products (1375a & 1375b & 1375c & 1375d) therefrom. A plurality of volatile reaction products (1375a & 1375b & 1375c & 1375d) may be independently produced and enjoined together into a common fine separation device discharge conduit (1365), or a Sequence Step A Reaction Product Discharge (A1-OUT), that contains a vapor and gas reaction product (1375) mixture comprised of a cumulative amalgam of each independent reaction product (1375a & 1375b & 1375c & 1375d). The common thermochemical reactor (1500) accepts the fixed carbon feedstock components transferred from each separate subsystem's coarse separation device dipleg (1400a & 1400b & 1400c & 1400d) and fine separation device dipleg (1355a & 1355b & 1355c & 1355d) and resultantly outputs a common reactor particulate-laden syngas stream (1600), or a Sequence Step A Syngas Discharge (A2-OUT).

In some instances, as depicted in FIG. 3., a total of four hydrous devolatilization and solids circulation subsystems (2025a & 2025b & 2025c & 2025d) may be used, however, as few as one may be used. Preferably, each hydrous devolatilization and solids circulation subsystem's dense-phase solids transport conduit (1215a & 1215b & 1215c & 1215d) draw bed solids (1520) from the thermochemical reactor (1500) at polar equidistant locations positioned around the circumference of the common thermochemical reactor (1500); for example, in the embodiment of FIG. 3, four separate hydrous devolatilization and solids circulation subsystems (2025a & 2025b & 2025c & 2025d) are shown, so therefore it is preferred that each dense-phase solids transport conduit (1215a & 1215b & 1215c & 1215d) be spaced 90 degrees apart from one another. For the embodiment depicted in FIG. 1, wherein two separate hydrous devolatilization and solids circulation subsystems (2025a & 2025b) are shown, it would be preferred that each dense-phase solids transport conduit (1215a & 1215b) be spaced 180 degrees apart from one another.

The feedstock conversion system (1800) of FIG. 3 permits processing of multiple feedstocks simultaneous and at varying feedstock throughputs, scales, composition and moisture content.

Figure 4:
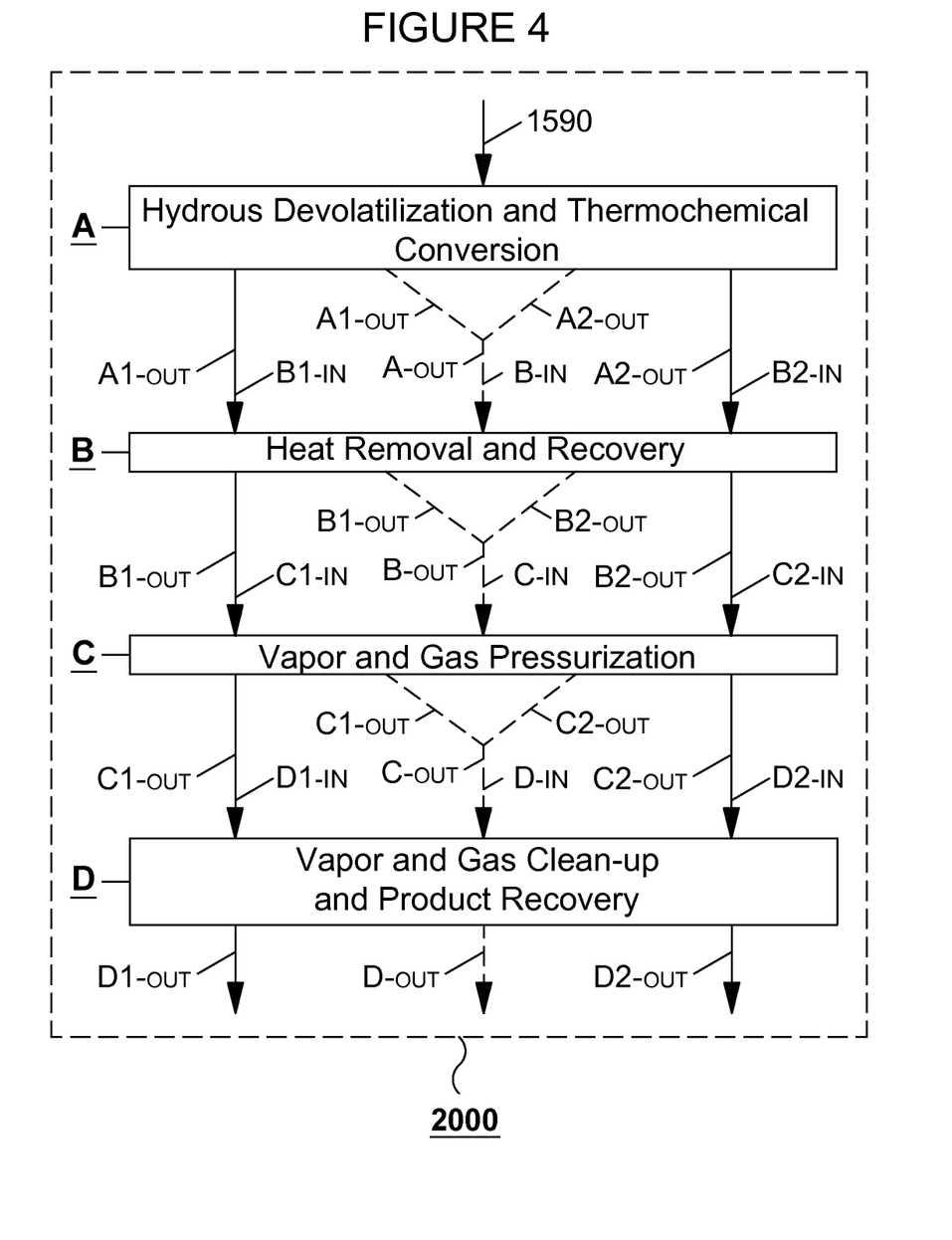
FIG. 4 shows options for different system combinations and permutations relevant to the overall continuous energy integrated feedstock-to-crude oil conversion process.

FIG. 4 depicts the sequence steps of the energy integrated continuous feedstock-to-crude oil conversion process (2000) and illustrates varying combinations and permutations associated with integrating each process step with one another.

Sequence Step A, Hydrous Devolatilization and Thermochemical Conversion (A) accepts a feedstock (1590) and may output either: a Sequence Step A Reaction Product Discharge (A1-OUT) and a Sequence Step A Syngas Discharge (A2-OUT); or a Sequence Step A Combined Syngas and Reaction Product Discharge (A-OUT).

Sequence Step A Combined Syngas and Reaction Product Discharge (A-OUT) is defined as the combination of aforesaid (A1-OUT) and (A2-OUT) into one common stream; Sequence Step A Combined Syngas and Reaction Product Discharge (A-OUT) is synonymously termed Sequence Step B Combined Syngas and Reaction Product Inlet (B-IN).

Sequence Step A Reaction Product Discharge (A1-OUT) is synonymous with Sequence Step B Reaction Product Inlet (B1-IN) and the terminology used here indicates the transfer across the control volume boundary between Sequence Step A, Hydrous Devolatilization and Thermochemical Conversion (A) and Sequence Step B, Heat Removal and Recovery (B).

Sequence Step A Syngas Discharge (A2-OUT) is synonymous with Sequence Step B Syngas Inlet (B2-IN) and the terminology used here indicates the transfer across the control volume boundary between Sequence Step A, Hydrous Devolatilization and Thermochemical Conversion (A) and Sequence Step B, Heat Removal and Recovery (B).

Sequence Step B, Heat Removal and Recovery (B) may accept either: a Sequence Step B Reaction Product Inlet (B1-IN) and a Sequence Step B Syngas Inlet (B2-IN); or a Sequence Step B Combined Syngas and Reaction Product Inlet (B-IN).

Sequence Step B, Heat Removal and Recovery (B) may output either: a Sequence Step B Reaction Product Discharge (B1-OUT) and a Sequence Step B Syngas Discharge (B2-OUT); or a Sequence Step B Combined Syngas and Reaction Product Discharge (B-OUT).

Sequence Step B Combined Syngas and Reaction Product Discharge (B-OUT) is defined as the combination of aforesaid (B1-OUT) and (B2-OUT) into one common stream; Sequence Step B Combined Syngas and Reaction Product Discharge (B-OUT) is synonymously termed Sequence Step C Combined Syngas and Reaction Product Inlet (C-IN).

Sequence Step B Reaction Product Discharge (B1-OUT) is synonymous with Sequence Step C Reaction Product Inlet (C1-IN) and the terminology used here indicates the transfer across the control volume boundary between Sequence Step B, Heat Removal and Recovery (B) and Sequence Step C, Vapor and Gas Pressurization (C).

Sequence Step B Syngas Discharge (B2-OUT) is synonymous with Sequence Step C Syngas Inlet (C2-IN) and the terminology used here indicates the transfer across the control volume boundary between Sequence Step B, Heat Removal and Recovery (B) and Sequence Step C, Vapor and Gas Pressurization (C).

Sequence Step C, Vapor and Gas Pressurization (C) may accept either: a Sequence Step C Reaction Product Inlet (C1-IN) and a Sequence Step C Syngas Inlet (C2-IN); or a Sequence Step C Combined Syngas and Reaction Product Inlet (C-IN).

Sequence Step C, Vapor and Gas Pressurization (C) may output either: a Sequence Step C Reaction Product Discharge (C1-OUT) and a Sequence Step C Syngas Discharge (C2-OUT); or a Sequence Step C Combined Syngas and Reaction Product Discharge (C-OUT).

Sequence Step C Combined Syngas and Reaction Product Discharge (C-OUT) is defined as the combination of aforesaid (C1-OUT) and (C2-OUT) into one common stream; Sequence Step C Combined Syngas and Reaction Product Discharge (C-OUT) is synonymously termed Sequence Step D Combined Syngas and Reaction Product Inlet (D-IN).

Sequence Step C Reaction Product Discharge (C1-OUT) is synonymous with Sequence Step D Reaction Product Inlet (D1-IN) and the terminology used here indicates the transfer across the control volume boundary between Sequence Step C, Vapor and Gas Pressurization (C) and Sequence Step D, Vapor and Gas Clean-up and Product Recovery (D).

Sequence Step C Syngas Discharge (C2-OUT) is synonymous with Sequence Step D Syngas Inlet (D2-IN) and the terminology used here indicates the transfer across the control volume boundary between Sequence Step C, Vapor and Gas Pressurization (C) and Sequence Step D, Vapor and Gas Clean-up and Product Recovery (D).

Sequence Step D, Vapor and Gas Clean-up and Product Recovery (D) may accept either: a Sequence Step D Reaction Product Inlet (D1-IN) and a Sequence Step D Syngas Inlet (D2-IN); or a Sequence Step D Combined Syngas and Reaction Product Inlet (D-IN).

Sequence Step D, Vapor and Gas Clean-up and Product Recovery (D) may output either: a Sequence Step D Reaction Product Discharge (D1-OUT) and a Sequence Step D Syngas Discharge (D2-OUT); or a Sequence Step D Combined Syngas and Reaction Product Discharge (D-OUT).

Although the invention has been described with regard to certain preferred embodiments which constitute the best mode presently known to the inventors, it should be understood that various changes and modifications as would be obvious to one having an ordinary skill in the art may be made without departing from the scope of the invention which is defined solely by the appended claims.

TABLE OF REFERENCE NUMERALS devolatilization chamber (1000a & 1000b)
riser (1200a & 1200b)
downwardly declined transfer entrance section (1210a & 1210b)
dense-phase solids transport conduit (1215a & 1215b)
reactor nozzle (1260a & 1260b)
coarse separation device (1300a & 1300b)
fine separation device (1350a & 1350b)
fine separation device dipleg (1355a & 1355b)
char stream (1360a & 1360b)
fine separation device discharge conduit (1365a & 1365b)
volatile reaction products (1375a & 1375b)
fine mixed stream (1380a & 1380b)
coarse separation device dipleg (1400a & 1400b)
vertical dipleg upper section (1402a & 1402b)
angled dipleg lower section (1404a & 1404b)
aeration ports (1410a & 1410b)
fluidization media (1412a & 1412b)
fluidization media distributor (1414a & 1414b)
constant level (1422a & 1422b)
slug breakers (1420a & 1420b)
dipleg nozzle (1440a & 1440b)
reactor (1500)
gas-solids flow regulator (1505a & 1505b)
dense fluid bed (1510)

TABLE OF REFERENCE NUMERALS-continued bed solids (1520)
char (1522)
fluidization media (1530)
fluidization media distributor (1540)
solids drain system (1550)
freeboard zone (1560)
heating conduits (1570)
primary cyclone (1580)
primary cyclone dipleg (1582)
fluid addition stages (1585)
feedstock (1590a & 1590b)
fixed carbon feedstock components (1590x)
volatile feedstock components (1590y)
particulate-laden syngas stream (1600)
reactor discharge conduit (1602)
coarse mixed stream (1610a & 1610b)
coarse separation device discharge conduit (1612a & 1612b)
conical-shaped reducer portion (1625a & 1625b)
fluidization media (1630a & 1630b)
constant cross-sectional portion (1635)
fluidization media distributor (1640a & 1640b)
solids drain system (1650a & 1650b)
intermediate solids mixture (1655a & 1655b)
sorbent (1695a & 1695b)
feedstock conversion system (1800)
secondary cyclone (1900)
particulate-depleted syngas stream (1910)
secondary cyclone discharge conduit (1915)
fly ash solids (1920)
secondary cyclone dipleg (1925)
energy integrated continuous feedstock-to-crude oil conversion process (2000)
hydrous devolatilization and solids circulation subsystem (2025a & 2025b)
reaction product heat recovery steam generator (HRSG) (8025)
syngas heat recovery steam generator (HRSG) (8050)
steam jet ejector (8035)
water source (100)
steam (200)
steam (300)
steam (400)
Sequence Step A, Hydrous Devolatilization and Thermochemical Conversion (A)
Sequence Step B, Heat Removal and Recovery (B)
Sequence Step C, Vapor and Gas Pressurization (C)
Sequence Step D, Vapor and Gas Clean-up and Product Recovery (D)
Sequence Step A Reaction Product Discharge (A1-OUT)
Sequence Step A Syngas Discharge (A2-OUT)
Sequence Step A Combined Syngas and Reaction Product Discharge (A-OUT)
Sequence Step B Reaction Product Inlet (B1-IN)
Sequence Step B Syngas Inlet (B2-IN)
Sequence Step B Combined Syngas and Reaction Product Inlet (B-IN)
Sequence Step B Reaction Product Discharge (B1-OUT)
Sequence Step B Syngas Discharge (B2-OUT)
Sequence Step B Combined Syngas and Reaction Product Discharge (B-OUT)
Sequence Step C Reaction Product Inlet (C1-IN)
Sequence Step C Syngas Inlet (C2-IN)
Sequence Step C Combined Syngas and Reaction Product Inlet (C-IN)
Sequence Step C Reaction Product Discharge (C1-OUT)
Sequence Step C Syngas Discharge (C2-OUT)
Sequence Step C Combined Syngas and Reaction Product Discharge (C-OUT)
Sequence Step D Reaction Product Inlet (D1-IN)
Sequence Step D Syngas Inlet (D2-IN)
Sequence Step D Combined Syngas and Reaction Product Inlet (D-IN)
Sequence Step D Reaction Product Discharge (D1-OUT)
Sequence Step D Syngas Discharge (D2-OUT)
Sequence Step D Combined Syngas and Reaction Product Discharge (D-OUT)

What is claimed is:

1. A feedstock conversion process for simultaneously producing synthetic crude oil and syngas from first and second feedstocks (1590a & 1590b), the process comprising:

subjecting, in a first chamber (1000*a*), the first feedstock (1590*a*) to a first indirectly-heated hydrous devolatilization process using steam as a fluidization medium and operating under a first set of processing conditions, to produce a first coarse mixed stream (1610*a*) containing char and first volatile reaction products (1375*a*);

subjecting, in a second chamber (1000*b*), the second feedstock (1590*b*) to a second indirectly-heated hydrous devolatilization process using steam as a fluidization medium and operating under a second set of processing conditions to produce a second coarse mixed stream (1610*b*) containing char and second volatile reaction products (1375*b*);

separating volatile reaction products (1375*a*, 1375*b*) from char in the first coarse mixed stream (1610*a*) and the second coarse mixed stream (1610*b*) to create a first fine mixed stream (1380*a*) and a second fine mixed stream (1380*b*) and a first char stream (1360*a*) and a second char stream (1360*b*);

inputting the first char stream (1360*a*) into a common reactor (1500) via a first conduit (1355*a*), and introducing the second char stream (1360*b*) into the common reactor (1500) via a second conduit (1355*b*), and converting the first char stream (1360*a*) and the second char stream (1360*b*) into syngas via an indirectly heated thermochemical process of steam reforming, partial oxidation, or both; and condensing at least a portion of both the first and second volatile reaction products (1375*a*, 1375*b*) from the first and second fine mixed streams (1380*a*, 1380*b*), to produce synthetic crude oil;

wherein:

the first and second feedstocks (1590*a* & 1590*b*) differ from one another in composition and moisture content.

2. The feedstock conversion process according to claim 1, further comprising:

varying the composition or type of feedstock (1590*a*, 1590*b*) during uninterrupted operation of the conversion process.

3. A feedstock conversion process for simultaneously producing synthetic crude oil and syngas from a carbonaceous feedstock (1590*a*) comprising fixed carbon feedstock components (1590*x*, 1590*xa*) and volatile feedstock components (1590*y*, 1590*ya*), the process comprising:

(a) introducing the carbonaceous feedstock (1590*a*) into a devolatilization chamber (1000*a*) having bed solids (1520);

(b) in the devolatilization chamber, reacting the volatile feedstock components with steam (1630*a*) at a temperature of about 320° C. to about 569.99° C. to produce:
 (i) an intermediate solids mixture (1655*a*) comprising bed solids (1520) and the fixed carbon feedstock components (1590*xa*); and
 (ii) a coarse mixed stream (1610*a*) comprising volatile reaction products (1375*a*) and char;

(c) separating the volatile reaction products (1375*a*) from char in the first coarse mixed stream (1610*a*) to create a char stream (1360*a*) and a fine mixed stream (1380*a*) containing volatile reaction products (1375*a*);

(d) transferring the intermediate solids mixture (1655*a*) and char stream (1360*a*) into a fluidized bed reactor (1500) already containing some bed solids (1520);

(e) in the fluidized bed reactor (1500), reacting the char stream (1360*a*) and the fixed carbon feedstock components (1590*x*) within the intermediate solids mixture (1655*a*), with steam and oxygen, to produce a particulate-laden syngas stream (1600) containing syngas and fly-ash solids;

(f) transferring a portion of the bed solids (1520) in the fluidized bed reactor (1500) into the devolatilization chamber (1000*a*); and (g) condensing at least a portion of the volatile reaction products (1375*a*) from the coarse mixed stream (1610*a*) to produce synthetic crude oil.

4. The feedstock conversion process according to claim 3, comprising in step (d), transferring the intermediate solids mixture (1655*a*) into the fluidized bed reactor (1500) via a gas solids flow regulator (1505*a*) into which a vapor or gas (1412*a*) is introduced.

5. The feedstock conversion process according to claim 4, comprising:

in step (d), transferring the intermediate solids mixture (1655*a*) and char stream (1360*a*) into said fluidized bed reactor (1500) via separate inputs (1440*a*, 1355*a*) into said reactor (1500).

6. The feedstock conversion process according to claim 4, comprising:

in step (b), separating the intermediate solids mixture (1655*a*) from the coarse mixed stream (1610*a*); and in step (d), introducing the intermediate solids mixture (1655*a*) and said char stream (1360*a*) separated out of the coarse mixed stream (1610*a*), into the bed solids (1520) of the fluidized bed of the reactor (1500).

7. The feedstock conversion process according to claim 3, comprising in step (e):

from gas and solids present in a freeboard zone (1560) of the fluidized bed reactor (1500), separating particulate-laden syngas from char (1522) and bed solids (1520), to form said particulate-laden syngas stream (1600); and recycling said char (1522) and bed solids (1520) back into the bed of the fluidized bed reactor (1500);

wherein said freeboard zone (1560) is positioned within the fluidized bed reactor (1500) above a dense fluid bed (1510).

8. The feedstock conversion process according to claim 3, comprising:

removing fly-ash solids from the particulate-laden syngas stream (1600) to form a particulate-depleted syngas-stream (1910); and cooling the particulate-depleted syngas-stream (1910).

9. The feedstock conversion process according to claim 3, comprising:

after step (c) and before step (d), cooling the fine mixed stream (1380*a*) to above a dew point of condensable vapors contained therein.

10. The feedstock conversion process according to claim 9, comprising:

introducing carbon dioxide into the fluidized bed reactor (1500) to react char in the char stream (1360*a*) to produce syngas for said particulate-laden syngas stream (1600).

11. The feedstock conversion process according to claim 3, comprising:

after step (e) removing fly-ash solids from the particulate-laden syngas stream (1600) to form a particulate-depleted syngas-stream (1910).

12. The feedstock conversion process according to claim 11, comprising:

introducing carbon dioxide into the fluidized bed reactor (1500) to react char in the char stream (1360*a*) to produce syngas for said particulate-laden syngas stream (1600).

13. The feedstock conversion process according to claim 3, comprising:
introducing carbonaceous feedstock (1590*a*) into the devolatilization chamber (1000*a*) at a throughput ranging from about 20 tons per day to about 250 tons per day.

14. The feedstock conversion process according to claim 3, wherein in step (b):
the carbonaceous feedstock (1590*a*) is reacted with steam (1630*a*) at a pressure of about 0.65 bar to about 2 bar.

15. The feedstock conversion process according to claim 14, comprising:
operating the fluid bed reactor at a higher pressure than the devolatilization chamber.

16. The feedstock conversion process according to claim 15, wherein:
a ratio of the pressure of the fluid bed reactor to the pressure of the devolatilization chamber is between 1.5 and 3.0.

\* \* \* \* \*

UNITED STATES PATENT AND TRADEMARK OFFICE
CERTIFICATE OF CORRECTION

PATENT NO. : 11,479,727 B2
APPLICATION NO. : 14/355948
DATED : October 25, 2022
INVENTOR(S) : Ravi Chandran, Daniel Michael Leo and Shawn Robert Freitas

Page 1 of 1

It is certified that error appears in the above-identified patent and that said Letters Patent is hereby corrected as shown below:

In the Specification

Column 1, Lines 13-14, below "2011", insert -- The contents of the aforementioned applications are incorporated by reference in their entirety. --, as a new paragraph.

Signed and Sealed this
Third Day of January, 2023

Katherine Kelly Vidal
*Director of the United States Patent and Trademark Office*